(12) United States Patent
Collette

(10) Patent No.: US 8,387,911 B2
(45) Date of Patent: Mar. 5, 2013

(54) DUCTED FAN CORE FOR USE WITH AN UNMANNED AERIAL VEHICLE

(75) Inventor: Daniel Ross Collette, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 1257 days.

(21) Appl. No.: 12/179,690

(22) Filed: Jul. 25, 2008

(65) Prior Publication Data
US 2010/0019098 A1    Jan. 28, 2010

(51) Int. Cl.
*B64C 29/00* (2006.01)
(52) U.S. Cl. ............... 244/23 C; 244/7 B; 244/12.2
(58) Field of Classification Search ............ 244/7 B, 244/12.1, 12.2, 23 A, 23 C, 55
See application file for complete search history.

(56) References Cited

U.S. PATENT DOCUMENTS

| | | | |
|---|---|---|---|
| 2,953,320 A * | 9/1960 | Parry | 244/12.2 |
| 3,034,747 A | 5/1962 | Lent | |
| 3,054,578 A | 9/1962 | Brocard | |
| 3,148,847 A * | 9/1964 | Manificat | 244/17.17 |
| 3,524,611 A | 8/1970 | Frank | |
| 3,584,810 A * | 6/1971 | Velton | 244/23 C |
| 3,650,094 A | 3/1972 | Goodwin | |
| 4,037,807 A * | 7/1977 | Johnston et al. | 244/7 B |
| 4,109,750 A | 8/1978 | Wirt | |
| 4,387,867 A | 6/1983 | Jordan | |
| 4,461,436 A | 7/1984 | Messina | |
| 4,795,111 A * | 1/1989 | Moller | 244/23 C |
| 5,035,377 A | 7/1991 | Buchelt | |
| 5,114,097 A | 5/1992 | Williams | |
| 5,150,857 A | 9/1992 | Moffitt et al. | |
| 5,152,478 A | 10/1992 | Cycon et al. | |
| 5,277,380 A | 1/1994 | Cycon et al. | |
| 5,295,643 A * | 3/1994 | Ebbert et al. | 244/7 B |
| 5,351,913 A | 10/1994 | Cycon et al. | |
| 5,575,438 A | 11/1996 | McGonigle et al. | |
| 5,695,153 A | 12/1997 | Britton et al. | |
| RE36,487 E * | 1/2000 | Wainfan | 244/48 |

(Continued)

FOREIGN PATENT DOCUMENTS

| | | |
|---|---|---|
| EP | 1 767 453 B1 | 6/2008 |
| FR | 2 871 136 | 12/2005 |

(Continued)

OTHER PUBLICATIONS

Reply to European Examination Report for counterpart European Patent Application No. 09 160 870.3, dated Jul. 30, 11 pages.

(Continued)

*Primary Examiner* — Philip J Bonzell
(74) *Attorney, Agent, or Firm* — Shumaker & Sieffert, P.A.

(57) ABSTRACT

A ducted fan core for an unmanned aerial vehicle is provided that accommodates a wide variety of payloads. The ducted fan core comprises a frame, attached to which are an engine, gearbox assembly, fan, and a plurality of control vanes. A first surface on the frame comprises a plurality of connects or electrical traces. The plurality of connects are used to removably attach a variety of pods carrying various payloads. Thus, a wide variety of payloads may be delivered using the same unmanned aerial vehicle, simply by removing and attaching different pods to a fixed vehicle core. These pods may be shaped so as to form part of the vehicle exterior, and when the pods are attached to the frame, they enhance the aerodynamics of the vehicle.

17 Claims, 3 Drawing Sheets

U.S. PATENT DOCUMENTS

| | | | |
|---|---|---|---|
| 6,056,237 | A | 5/2000 | Woodland |
| 6,270,038 | B1 | 8/2001 | Cycon et al. |
| 6,450,445 | B1 | 9/2002 | Moller |
| 6,502,787 | B1 * | 1/2003 | Barrett ................ 244/23 A |
| 6,575,402 | B1 | 6/2003 | Scott |
| 6,581,872 | B2 | 6/2003 | Walmsley |
| 6,588,701 | B2 | 7/2003 | Yavnai |
| 6,604,706 | B1 | 8/2003 | Bostan |
| 6,691,949 | B2 | 2/2004 | Plump et al. |
| 6,721,646 | B2 | 4/2004 | Carroll |
| 6,840,480 | B2 | 1/2005 | Carroll |
| 6,845,942 | B2 | 1/2005 | Paul |
| 6,883,503 | B2 | 4/2005 | Carroll |
| 6,886,776 | B2 | 5/2005 | Wagner et al. |
| 6,976,653 | B2 | 12/2005 | Perlo et al. |
| 7,032,861 | B2 | 4/2006 | Sanders, Jr. et al. |
| 7,044,422 | B2 | 5/2006 | Bostan |
| 7,093,798 | B2 | 8/2006 | Whelan et al. |
| 7,149,611 | B2 | 12/2006 | Beck et al. |
| 7,201,346 | B2 | 4/2007 | Hansen |
| 7,237,750 | B2 | 7/2007 | Chiu et al. |
| 7,249,732 | B2 | 7/2007 | Sanders, Jr. et al. |
| 7,841,563 | B2 * | 11/2010 | Goossen et al. ............ 244/175 |
| 8,011,614 | B2 * | 9/2011 | Bird .................. 244/17.19 |
| 2004/0094662 | A1 | 5/2004 | Sanders, Jr. et al. |
| 2004/0129828 | A1 | 7/2004 | Bostan |
| 2005/0082421 | A1 | 4/2005 | Perlo et al. |
| 2005/0127239 | A1 * | 6/2005 | Srivastava .............. 244/12.2 |
| 2006/0049304 | A1 | 3/2006 | Sanders, Jr. et al. |
| 2006/0192047 | A1 * | 8/2006 | Goossen ................ 244/17.23 |
| 2006/0231675 | A1 | 10/2006 | Bostan |
| 2007/0034738 | A1 | 2/2007 | Sanders, Jr. et al. |
| 2007/0034739 | A1 | 2/2007 | Yoeli |
| 2007/0051848 | A1 | 3/2007 | Mantych et al. |
| 2007/0193650 | A1 | 8/2007 | Annati |
| 2007/0221790 | A1 * | 9/2007 | Goossen et al. ............ 244/53 B |
| 2007/0228214 | A1 | 10/2007 | Horak |
| 2007/0244608 | A1 | 10/2007 | Rath et al. |
| 2007/0262195 | A1 | 11/2007 | Bulaga et al. |
| 2007/0295298 | A1 | 12/2007 | Mark |
| 2008/0054121 | A1 | 3/2008 | Yoeli |

FOREIGN PATENT DOCUMENTS

| | | |
|---|---|---|
| WO | 2000015497 A2 | 3/2000 |
| WO | 2004002821 A1 | 1/2004 |

OTHER PUBLICATIONS

European Search Report from corresponding EP Application No. 09160870.3, mailed Mar. 8, 2012, 5 pages.

European Examination Report from corresponding EP Application No. 09160870.3, mailed Mar. 20, 2012, 8 pages.

* cited by examiner

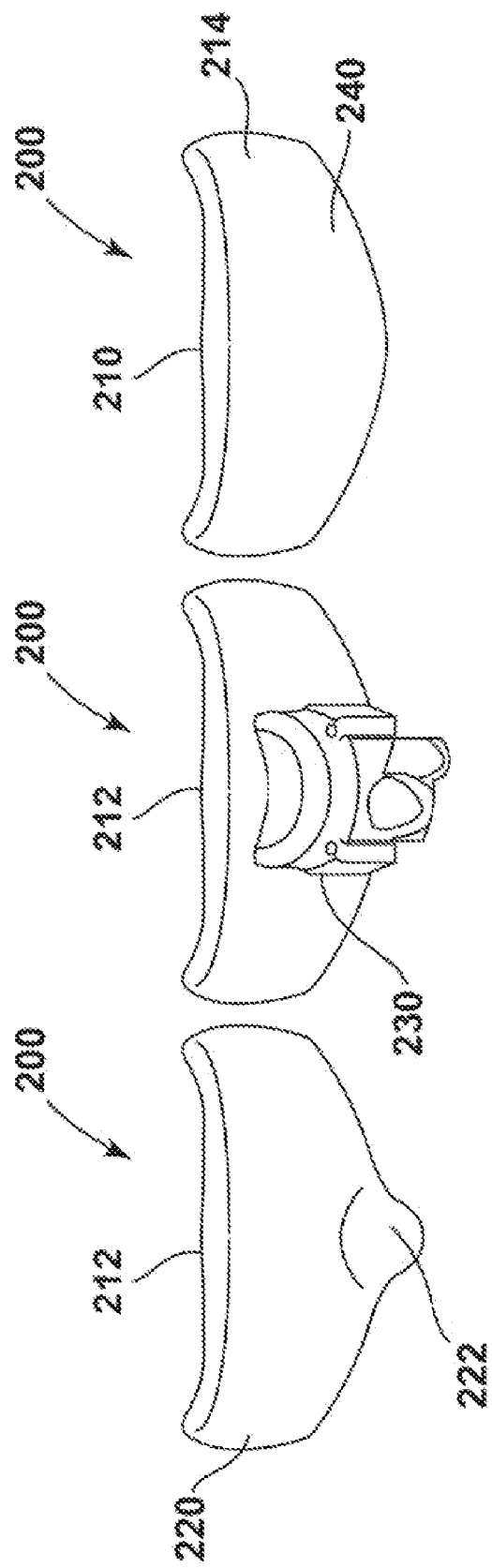

DUCTED FAN CORE FOR USE WITH AN UNMANNED AERIAL VEHICLE

GOVERNMENT RIGHTS

This invention was made with Government support under Prime Contract Number W56 HZV-05-C-0724 awarded by the United States Army. The Government may have certain rights in this invention.

FIELD

The present invention relates generally to unmanned aerial vehicles. More particularly, the present invention relates to a ducted fan core for use with an unmanned aerial vehicle.

BACKGROUND

Unmanned aerial vehicles ("UAVs") are remotely piloted or self-piloted aircraft that can carry cameras, sensors, communications equipment, or other payloads. A UAV is capable of controlled, sustained, level flight and is powered by either a jet or an engine. The UAVs may be remotely controlled or may fly autonomously based on pre-programmed flight plans or more complex dynamic automation systems.

UAVs have become increasingly used for various applications where the use of manned flight vehicles is not appropriate or is not feasible. Such applications may include military situations, such as surveillance, reconnaissance, target acquisition, data acquisition, communications relay, decoy, harassment, or supply flights. These vehicles are also used in a growing number of civilian applications, such as firefighting when a human observer would be at risk, police observation of civil disturbances or crime scenes, reconnaissance support in natural disasters, and scientific research, such as collecting data from within a hurricane.

Currently, a wide variety of UAV shapes, sizes, and configurations exist. Typically it is the payload of the aircraft that is the desired product, not the aircraft itself. A payload is what the aircraft is carrying. UAVs are the delivery system for a payload and are developed to fill a particular application and a set of requirements. As previously mentioned, there are numerous applications for which a UAV may be used. For each new application, a different type of payload may be used. Because different payloads may require different processing capabilities, or may comprise different sizes, a variation of the UAV typically must be developed for each type of payload, or a completely new aircraft typically must be designed. Designing a new aircraft or developing a variation of the current UAV in use is time-consuming and costly.

SUMMARY

In accordance with the present invention, a ducted fan core for an unmanned aerial vehicle is provided. This ducted fan core can accommodate and deliver a wide variety of payloads with little or no modification to the vehicle itself.

The ducted fan core comprises a frame. An engine, gearbox assembly, fan, and a plurality of control vanes are mounted to the frame. A first surface on the frame comprises a plurality of connects. These connects could be electric or mechanical connects. The plurality of connects are used to attach pods carrying various payloads. Once the pods are connected to the frame, the vehicle flies to its destination. After the unmanned aerial vehicle has completed the flight, the vehicle lands and the pods may be removed and unloaded. The same pods may later be re-attached to the frame. Alternatively, if new pods carrying various other payloads are desired for another operation, the new pods may be attached to the first surface of the frame. The pods may be shaped so that the leading edge of each pod enhances the aerodynamics of the vehicle while in flight. When the pods are attached to the frame, each pod forms part of the exterior surface of the vehicle and the aerodynamic shape of the pod aids in the operation of the vehicle during flight.

A core of fixed components coupled with the capability to remove and exchange pods gives a UAV versatility. A wide variety of payloads may be delivered using the same UAV, simply by removing and attaching different pods to the same vehicle core. This allows for greater manufacturing simplicity, as only a single type of unmanned aerial vehicle need be constructed, as well as decreases the cost of storing and maintaining a plurality of different types of unmanned aerial vehicles.

This vehicle will provide intelligence on enemy activity without risking the lives of human pilots or ground reconnaissance teams. For civilian use, the vehicle could be used by law enforcement for surveillance on SWAT operations.

BRIEF DESCRIPTION OF THE DRAWINGS

Various embodiments are described herein with reference to the following drawings. Certain aspects of the drawings are depicted in a simplified way for reason of clarity. Not all alternatives and options are shown in the drawings and, therefore, the invention is not limited in scope to the content of the drawings. In the drawings:

FIG. 2a is a perspective view of an avionics pod;

FIG. 2b is a perspective view of a payload pod;

FIG. 2c is a perspective view of a common fuel pod;

FIG. 3b is a side view of the ducted fan of FIG. 3a.

DETAILED DESCRIPTION

Figure 1:
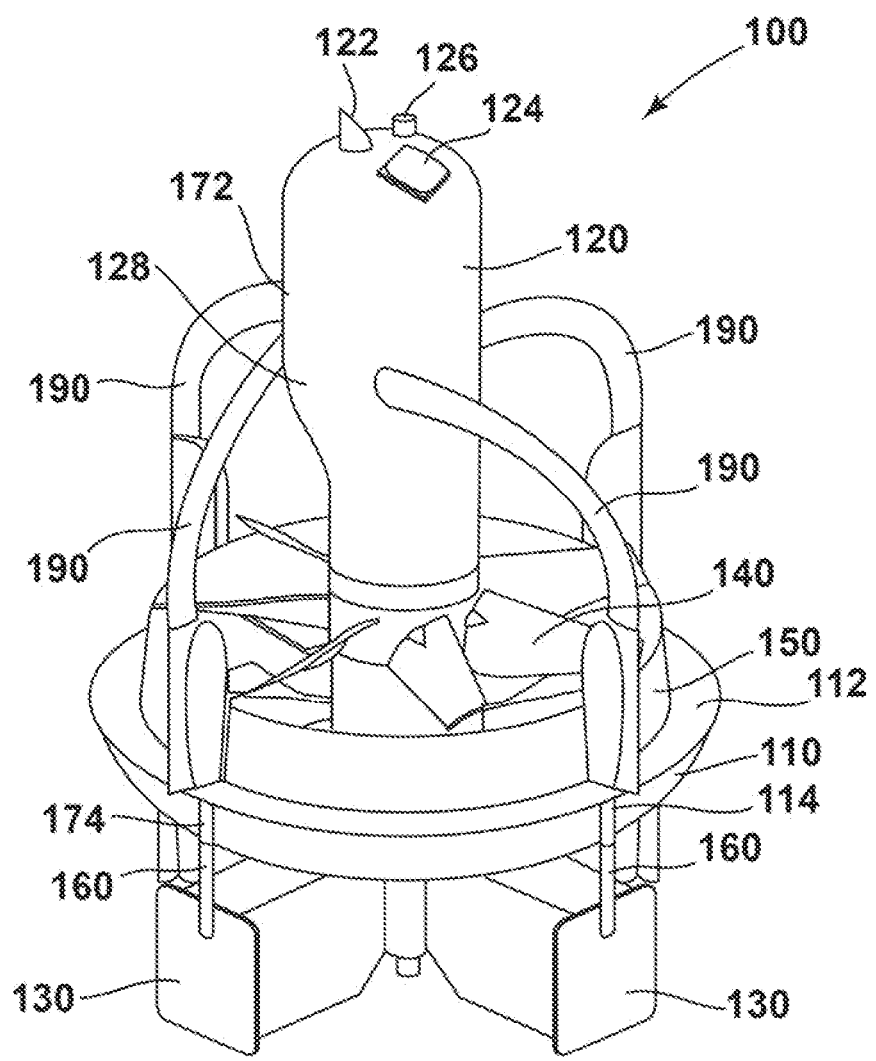
FIG. 1 is a perspective view of a ducted fan according to one embodiment of the invention.

FIG. 1 depicts a perspective view of a ducted fan core 100 according to one embodiment of the present invention. Ducted fan core 100 is provided for use as an unmanned aerial vehicle.

Ducted fan core 100 comprises a frame 110, an engine 120, a plurality of control vanes 130, a fan 140, a duct portion 150, a plurality of bars 160, a plurality of actuators 170 (shown in FIG. 3b), a gearbox assembly (not shown), and a plurality of engine supports 190. Engine 120 comprises an exhaust port 122, a light 124, and an antenna holder 126. Frame 110 comprises a first surface 112. Each of the plurality of engine supports 190 comprises a first end 172 and a second end 174.

Fan 140 is mounted within duct portion 150. Duct portion 150 is attached to frame 110, extending through frame 110 as shown in FIG. 1. Engine 120 may be attached to fan 140. Second end 174 of each of the plurality of engine supports 190 is attached to first surface 112 of frame 110 and first end 172 of each of the plurality of engine supports 190 is attached to engine 120. Each of the plurality of actuators 170 is attached to each of the plurality of control vanes 130. Each of the plurality of control vanes 130 is attached to frame 110 with a bar of the plurality of bars 160. Each of the plurality of control vanes is also attached to each of the plurality of actuators 170. The gearbox assembly is attached to engine 120.

Frame 110 may be manufactured as part of duct portion 150. Alternatively, frame 110 may be manufactured separately from duct portion 150 and may be attached to duct portion 150. Frame 110 may be attached to duct portion 150 with a cement or glue. Alternatively, frame 110 may be attached to duct portion 150 mechanically. Frame 110 may be manufactured from metal. Alternatively, frame 110 may be manufactured from a durable plastic or other material. First surface 112 of frame 110 may be a substantially flat surface. First surface 112 may comprise both electric and mechanical connects. First surface 112 may be a printed circuit board ("PCB") or may have embedded electrical traces. Ribbon or edge connectors or a printed circuit board edge may be used. Alternatively, first surface 112 may comprise a fuel line quick-disconnect fitting. The plurality of engine supports 190 may be affixed to first surface 112. Frame 110 may comprise a plurality of indents 114, as shown in FIG. 1. Second end 174 of an engine support may be inserted into an indent of the plurality of indents, affixing engine support 190 to frame 110. Alternatively, frame 110 may not have any indents, and each engine support 190 may be affixed to first surface 112 of frame 110.

Engine 120 may be a turbine engine. Alternatively, engine 120 may be a number of other engine types. Engine 120 may be offset to one side of the frame center to allow for the vehicle center of gravity to be adjusted. In FIG. 1, for example, a portion 128 of engine 120 is offset to the right of the frame. Exhaust port 122 serves as an opening to allow exhaust fumes to exit the engine. Light 124 is preferably lit while the fan is in operation, and serves to alert other vehicles in the air as well as control centers of the location of the UAV. Although only one light 124 is shown, more lights, or other signaling devices, may be present on the vehicle. Additionally, the location of light 124 may be in a different location than that shown in FIG. 1. Light 124 may blink. Alternatively, light 124 may remain on throughout the vehicle's entire flight. The gearbox assembly may be mounted to engine 120.

The plurality of engine supports 190 serves to support engine 120 within frame 110. Plurality of engine supports 190 may be manufactured from metal. Alternatively, plurality of engine supports 190 may be manufactured from plastic or another material. If plastic is used as the material of the engine supports, the plastic should be durable, as each engine support may be required to help maintain the position of engine 120. A first end 172 of each engine support may be attached to engine 120. Although four engine supports 190 are shown in FIG. 1, other numbers of engine supports may be used. Alternatively, second end 174 may be attached to a different part of frame 110.

Each bar of the plurality of bars 160 extends between the frame 110 and each of the control vanes 130, and is attached to a control vane. The plurality of bars 160 may be mechanically attached to the control vanes. The plurality of bars 160 may be made from a metal or a durable plastic. The plurality of bars 160 serves to stabilize the plurality of control vanes 130. The plurality of bars 160 may alternatively be part of the frame 110.

FIGS. 2a-2c illustrate exemplary pods 200 that may be attached to ducted fan core 100. Each pod may comprise a leading edge 210. A leading edge is a line connecting the forward-most points of the pod's profile; it is the front edge of the pod. When an aircraft moves forward, the leading edge is that part that first contacts the air. The leading edge may be perpendicular to the airflow, in which case it is called a straight wing. The leading edge may meet the airflow at an angle, in which case it is referred to as a swept wing. Leading edge 210 of pod 200 may be shaped to enhance the aerodynamic aspects of the UAV. For example, leading edge 210 may comprise a convex curve 212. When pod 200 is attached to frame 110 and the unmanned aerial vehicle is flying, air will hit leading edge 210 and flow in a desired direction so as to enhance the airspeed of the vehicle and minimize the obstruction of air hitting the vehicle. In addition, the shape of each pod 200 may be such that when the pods are affixed to frame 110, the pods form an exterior portion of the UAV. Pod 200 may comprise an outer shell 214 and a hollow interior (not shown). Air may flow over both the outer-facing side of outer shell 214 and the interior-facing side of outer shell 214. The interior-facing side of outer shell 214 may be shaped so that as air hits the leading edge, the air is guided down the interior-facing side and hits fan 140.

Each pod 200 preferably functions as a container. The payload, or carrying capacity, of each pod may vary. In an unmanned aerial vehicle, the payload may carry equipment or instruments, for example. More specifically, for example, pod 200 may contain cameras, fuel, gas, or electronics. A variety of pods may be used with a UAV. FIG. 2a illustrates a perspective view of an avionics pod 220. Avionics pod 220 may be used to carry avionics equipment, such as cameras, a laser designer, a range finder, or supplies. Avionics pod 220 may comprise an extension 222 to accommodate mission specific electronics. Payload pod 230 may be used to carry integrated flight management for the purpose of an application designed for the pod, i.e. surveillance. Common fuel pod 240 may be used to carry fuel. Pod 200 may carry payloads comprising cameras for the purpose of taking photographs or to videotape the ground below the vehicle's flight path.

The UAV may be designed to be transported in a backpack. A modular lightweight load carrying equipment pack ("MOLLE") is an army and marine corps backpack. The MOLLE pack is a fully integrated, modular load bearing system consisting of a load bearing vest with butt pack, main ruck with sustainment pouches and sleeping bag compartment attached to an external frame. There is also a patrol pack, which can be used separately or combined with the main ruck for added load carrying capability. MOLLE can be configured in several different variations to fit the load handling needs of the mission. The load-bearing vest is typically worn and holds pockets for magazines and hand grenades. Although ducted fan core 100 is preferably designed to fit within a MOLLE pack, ducted fan core 100 may fit into a number of other bags or backpacks. Ducted fan core 100 may be used in non-military applications, and might not be housed within a pack for those applications.

The ducted fan core 100 may weigh approximately 6-8 lbs. However, ducted fan core 100 may weigh more or less than this value, depending on materials used and size. The UAV may operate at altitudes of 100 to 500 feet above ground level, and typically the UAV will fly between 10 and 500 feet above the ground. The UAV can provide forward and down-looking day or night video or still imagery. The UAV may operate in a variety of weather conditions including rain and moderate winds. The system requires minimal operator training. Portable ground stations may be used to guide the aircraft and receive images from the cameras. The ground station can be used to program a flight path for the UAV or control it manually. The aircraft can also be equipped with electro-optical cameras for daylight operations or infrared cameras for night missions.

The UAV may run autonomously, executing simple missions such as a program or reconnaissance, or it may run under the control of a crew. The crew may comprise a pilot and sensor operators. The pilot may drive the aircraft using controls that transmit commands over a C-band line-of-sight data link, or a Ku-Band satellite link. The aircraft may receive orders via an L-3 Com satellite data link system. The pilots and other crew members use images and radar received from the aircraft to make decisions regarding control of the UAV.

Figure 3B:
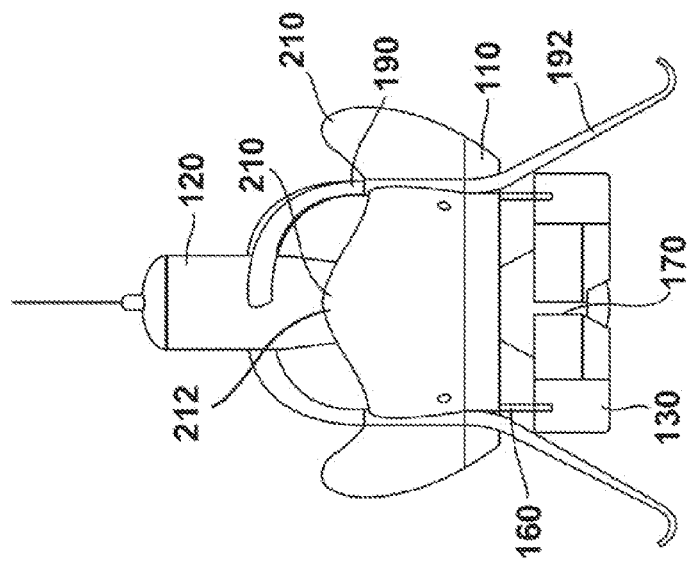
Figure 3A:
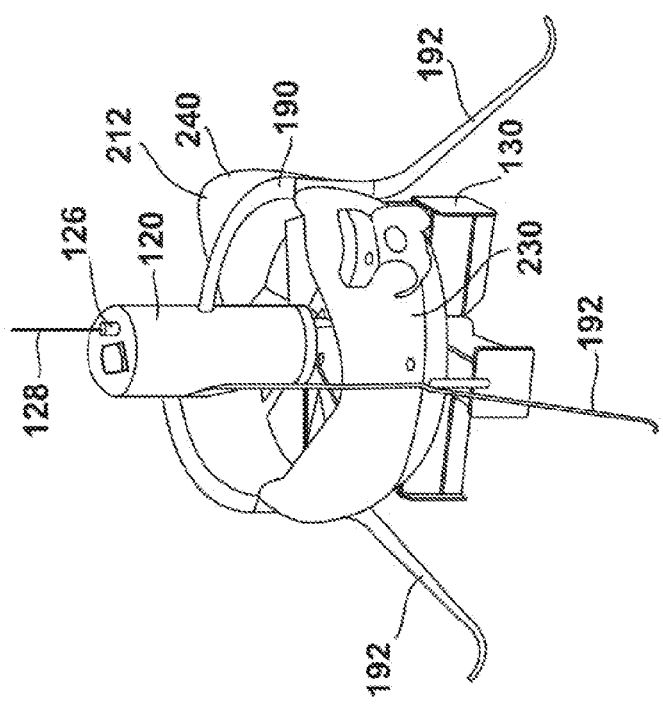
FIG. 3a is a perspective view of the ducted fan of FIG. 1 with attached pods and landing feet attached.

FIG. 3a is a perspective view of the ducted fan core of FIG. 1 in the operating position. FIG. 3b shows a side view of the ducted fan core of FIG. 3a. In FIG. 3a, pods 200 are attached to first surface 112 of frame 110. Additionally, landing feet 192 have been attached to the plurality of engine supports 190. Landing feet 192 serve to raise the UAV from the ground, enabling control vanes 130 to move so that the vehicle may be prepared for take off. Landing feet 192 also serve to land the vehicle once the vehicle has reached its final destination, protecting the parts that make up the core of the vehicle. Landing feet 192 may be removably attached to plurality of engine supports 190. Alternatively, landing feet 192 may be attached to another part of ducted fan core 100.

An antenna 128 may lie within antenna holder 126, and may allow the UAV to receive and transmit signals. Unmanned aerial vehicle may be remotely controlled, or may be self-controlled for a particular journey. Once the vehicle has launched, control vanes 130 receive signals to control the direction of flight. Control vanes 130 move in response to the signals, altering the course of airflow from fan 140, which guides the direction of flight for the vehicle. As the UAV flies, air contacts leading edge 210 of pods 200, flowing around the surface of each pod. Once the vehicle has reached its final destination (e.g. returned to base), landing feet 192 contact the ground. The pods 200 may then be removed and the payloads may be unloaded. The pods that were removed may then be re-attached to first surface 112 of frame 110. Alternatively, new pods may be attached to first surface 112 of frame 110.

I claim:

1. A system comprising:
   a frame including a first surface;
   an engine mounted to the frame;
   a plurality of control vanes mounted to the frame;
   a duct portion attached to the frame;
   a fan mounted within the duct portion; and
   at least one removable payload pod, wherein the at least one removable payload pod attaches to the frame via a plurality of connects included on the first surface and is arranged radially outward from the fan, and the at least one removable payload pod comprises an outer shell having a leading edge and an interior facing side shaped so that air striking the leading edge is guided down the interior-facing side to contact with the fan.

2. The system of claim 1, wherein the engine is a turbine engine and comprises an exhaust port.

3. The system of claim 1, wherein the plurality of connects comprises a fuel line fitting.

4. The system of claim 1, further comprising a modular lightweight load carrying equipment pack, wherein the system is sized to fit within the modular lightweight load carrying equipment pack.

5. The system of claim 1, wherein leading edge defines a convex curve.

6. The system of claim 1, wherein the at least one pod is configured to form a portion of the exterior surface of an unmanned aerial vehicle comprising the frame.

7. The system of claim 1, wherein
   the duct portion is physically separate from the frame and attached to the frame.

8. The system of claim 1, wherein
   the duct portion comprises the frame.

9. The system of claim 1, wherein the first surface is substantially flat.

10. The system of claim 1, further comprising a plurality of bars extending between the frame and the plurality of control vanes, wherein each of the plurality of bars is attached to a first axis point on a respective vane of the plurality of control vanes.

11. The system of claim 10, further comprising a plurality of actuators, wherein each of the plurality of actuators is attached to a second axis point on each of the plurality of control vanes.

12. The system of claim 1, further comprising a plurality of engine supports, wherein a first end of each engine support of the plurality of engine supports is attached to the engine.

13. The system of claim 12, wherein a second end of each engine support of the plurality of engine supports is attached to the first surface.

14. The system of claim 12, wherein the at least one pod is attached to at least one of the plurality of engine supports.

15. The system of claim 12, further comprising landing feet configured to be removably attached to the plurality of engine supports.

16. The system of claim 1, wherein the plurality of connects comprises electric connects.

17. The system of claim 16, wherein the electric connects comprises at least one of a printed circuit board or electrical traces embedded in the first surface of the frame.

* * * * *

UNITED STATES PATENT AND TRADEMARK OFFICE
CERTIFICATE OF CORRECTION

PATENT NO. : 8,387,911 B2
APPLICATION NO. : 12/179690
DATED : March 5, 2013
INVENTOR(S) : Daniel Ross Collette It is certified that error appears in the above-identified patent and that said Letters Patent is hereby corrected as shown below:

In the Claims:

Claim 5, col. 6, line 9: "wherein leading edge" should be changed to --wherein the leading edge--

Signed and Sealed this
Ninth Day of July, 2013

Teresa Stanek Rea
*Acting Director of the United States Patent and Trademark Office*